Nov. 8, 1966  S. E. KUHNS ET AL  3,283,868
VALUE-DISPENSING APPARATUS OPERABLE IN RESPONSE TO MOVEMENT
OF A VEHICLE A MINIMUM DISTANCE ALONG A PREDETERMINED PATH
Filed Feb. 23, 1965  4 Sheets-Sheet 1
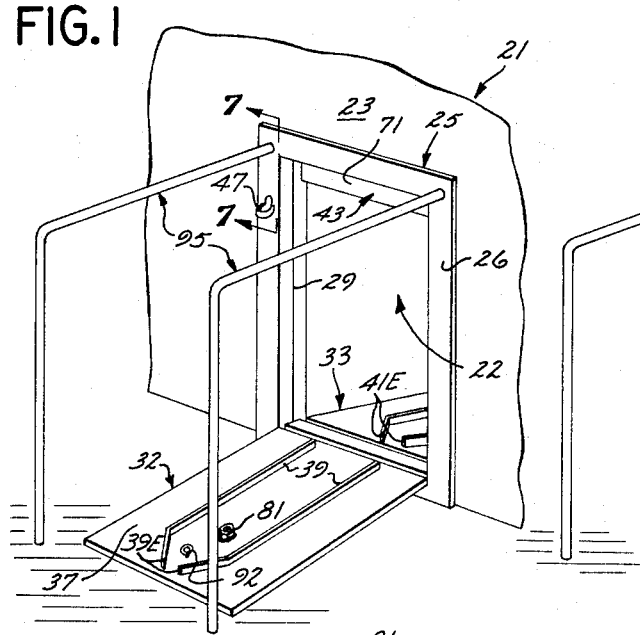
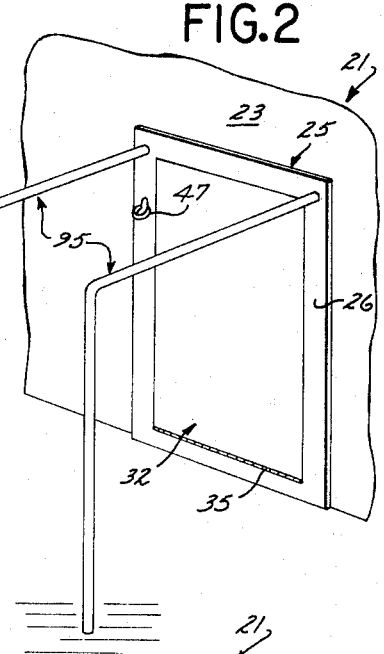
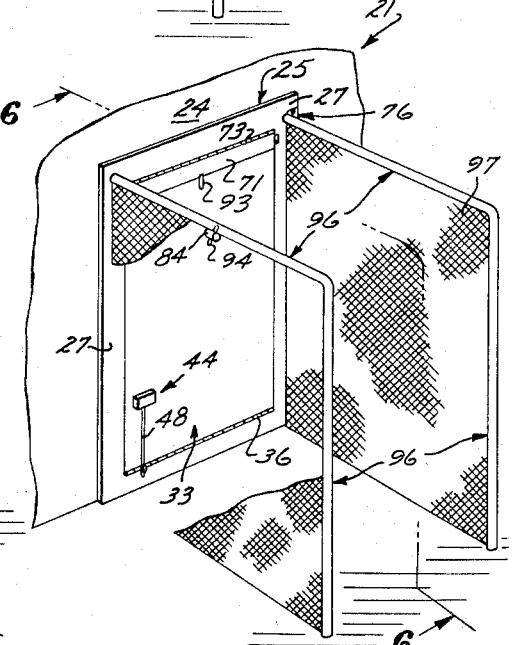
INVENTORS.
STANLEY E. KUHNS
ADELIA B. KUHNS

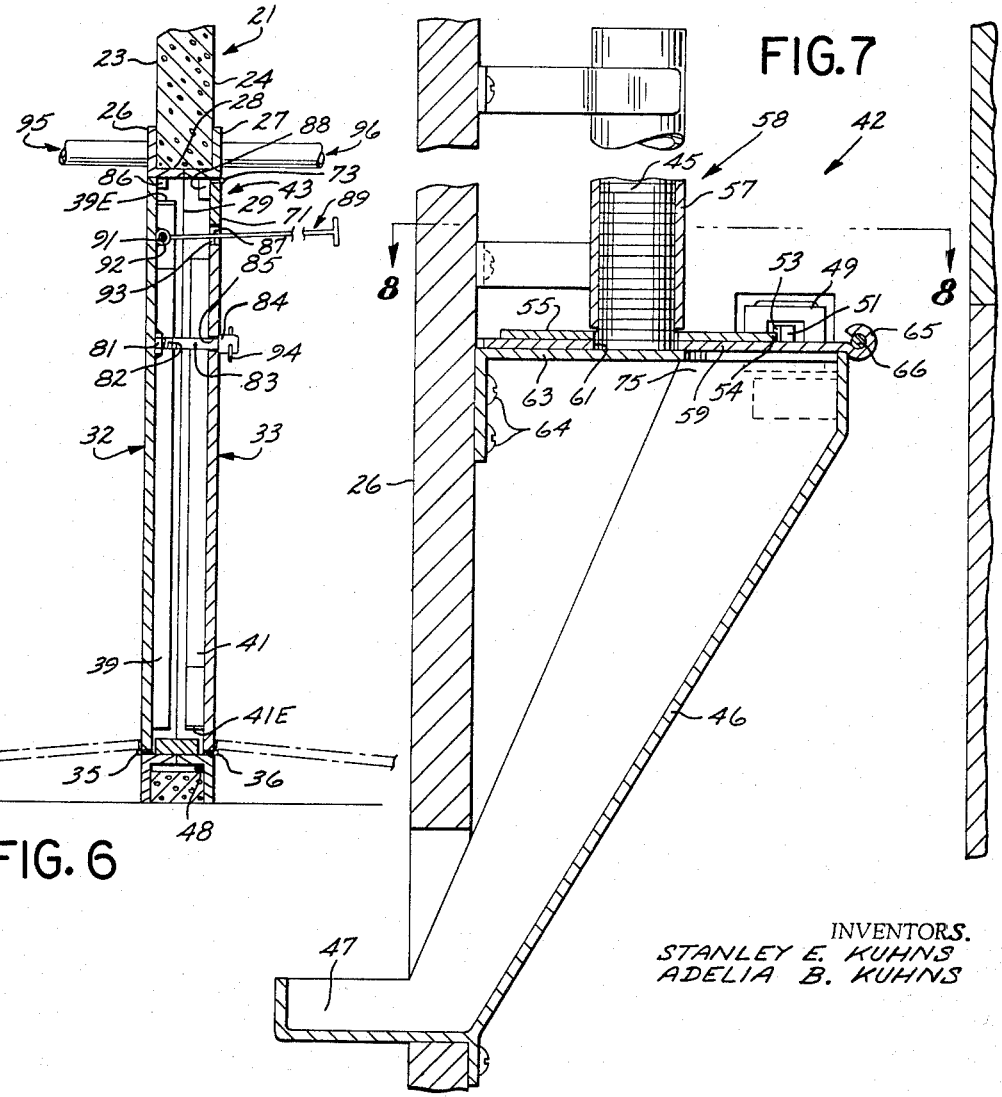

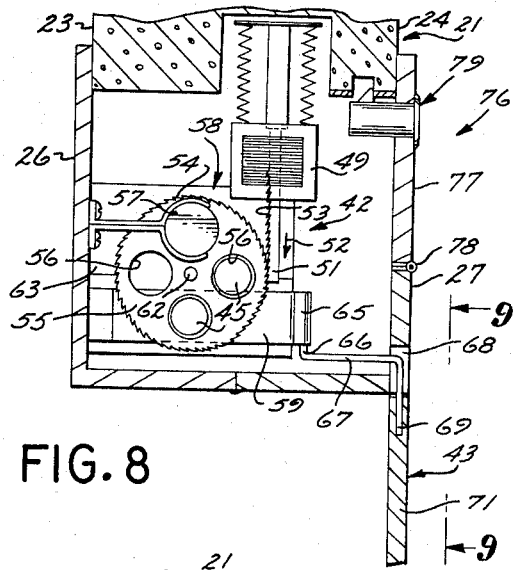

Nov. 8, 1966 S. E. KUHNS ETAL 3,283,868
VALUE-DISPENSING APPARATUS OPERABLE IN RESPONSE TO MOVEMENT
OF A VEHICLE A MINIMUM DISTANCE ALONG A PREDETERMINED PATH
Filed Feb. 23, 1965 4 Sheets-Sheet 4

INVENTORS.
STANLEY E. KUHNS
ADELIA B. KUHNS

3,283,868
VALUE-DISPENSING APPARATUS OPERABLE IN RESPONSE TO MOVEMENT OF A VEHICLE A MINIMUM DISTANCE ALONG A PREDETERMINED PATH
Stanley E. Kuhns and Adelia B. Kuhns, both of 21425 S. Wardham, Artesia, Calif.
Filed Feb. 23, 1965, Ser. No. 434,199
5 Claims. (Cl. 194—4)

Generally speaking, the present invention relates to a value-dispensing apparatus operable in response to movement of a vehicle a minimum distance along the predetermined path and adapted as a result of such movement of said vehicle to perform one complete value-dispensing operation, which may consist of a single-item dispensing operation such ts the dispensing of a single coin-simulating token, or a plurality thereof, so that something of a predetermined total value will be dispensed each time such a vehicle, which may comprise a conventional type metallic shopping cart or the like, although not specifically so limited in all forms of the invention, is moved said minimum distance along said predetermined path, which may actually comprise moving said shopping cart through an entryway or door means from what might be termed the outside or exterior side thereof to what might be termed the inside or interior side thereof, where there is usually located a cart storing region, such as the inside of a store, market, or the like, with said entryway or door means being formed in a wall between the outside of the building or structure housing said store and the interior thereof containing said store. However, it should be clearly understood that various other types of enclosure-defining effective wall means effectively defining various other types of cart storing regions or means are intended to be included and comprehended within the broad scope of the invention.

In other words, in one exemplary form of the invention, the vehicle may comprise a conventional type shopping cart mounted on underlying wheel means and the purpose of the invention is to cause shoppers who transport groceries or other items from the store in such a cart to an adjacent parking lot, or the like, for reloading into their automobiles, to then return said cart to the interior of the store or market. This now comprises a major problem, since most shoppers will leave the grocery cart outside of the market in the parking lot area adjacent to the region thereof where the person's car had been parked while shopping. This necessitates frequent cart retrieval operations by personnel of the grocery store, who must go out into the parking lot area adjacent to the store and return all such abandoned carts back to the interior of the grocery store so that they will be available for use by other shoppers and also in order to prevent their loss or theft, since each cart is relatively costly and, at the present time, the loss of such carts constitutes a very substantial cost item in the operation of large supermarket-type grocery stores and the like.

In addition to the fact that such shopping carts are frequently left in the parking area, which requires working time of market clerks who must periodically go out and round them up and transport them back into the store, the carts are also frequently left in the way of incoming or outgoing automobiles which may make it necessary for a driver to stop the automobile, get out, and move the cart in order to either park in a parking stall or to drive in or out of the parking area.

Also, the above-mentioned prior art problem is further complicated by the fact that the carts are frequently damaged as a result of careless handling by customers, such as allowing them to run into the adjacent streets or alleys where they may be damaged by automobiles, or where they may be very easily removed entirely from the store area and/or parking lot area by thieves or persons who would normally not think of such action but, because of the remoteness of the cart from the market and the ease with which it may be taken, may be inclined to do so. This is particularly true of children and adolescents.

The apparatus of the present invention is particularly advantageous for overcoming the above-mentioned prior art problems since one or more special entryways or doors may be installed in one or more walls of the market, usually close to the main doors and, in most cases, on two different sides of the market to provide easy accessibility thereto from each adjacent portion of the adjoining automobile parking areas. Each such entryway, entrance, or door is preferably provided with door closure means which can be controllably closed and locked, in one preferred form, from the inside of the market when the market is closed. However, when the market is open, such closure door means will normally be open and any grocery carts which are outside in the parking area will normally be wheeled, by the patron who has just used same, back to the closest one of said entryway or doors for said carts, and through same from the outside into the interior of the market, where it will be within a cart storing region inside of the market and normally inside of the fenced merchandise display portion of the market so that, in order for said cart to again get outside of the market, it must pass one of the checking stands. The incentive for the customer returning the cart from outside the market through the cart entryway or door into the inside of the market is the fact that a value-dispensing apparatus is positioned adjacent to said cart entryway or door and is arranged to be operated when the cart is passed from the outside of the market through the cart entryway or door into the interior of the market and to dispense something of value, which that customer will receive by way of a dispensing chute or the like. For example, metallic or plastic tokens or the like may comprise one form of valuable object dispensed by the dispensing apparatus when the cart is passed through the cart entryway or door into the interior of the market, and such tokens will normally be appropriately marked in a readily identifiable manner corresponding to the particular market or store (or in some cases perhaps to a complete chain or such stores) and will be redeemably by the checkers or cashiers of the market and will have an assigned value in merchandise or trade. Thus, it will be worthwhile for the patron to return the cart, since he will receive one or more valuable tokens which he can use, either at that time or the next time he returns to the market, for purchasing merchandise. This will be a worthwhile procedure for the market management since it will tend to minimizer or virtually eliminate all of the above-mentioned undesirable problems associated with the use of such grocery carts in the above-mentioned prior art manner where they are left in the parking area, outside of the parking area, are sometimes damaged, and, in some cases, are lost entirely.

It will be noted that the use of the present invention for the above-mentioned particular grocery cart retrieval purpose has the following numerous advantages: (1) it eliminates the labor cost of having a clerk go out to periodically round up carts from the parking area; (2) it eliminates the necessity for large numbers of carts being stocked by the store since normally all carts will be immediately returned to the storage area in the store immediately after they have been used and will be immediately available for subsequent use, thus requiring a much lesser number of carts to be stocked by the store; (3) it will be particularly advantageous during peak shopping hours since all carts will be available to the customers, whereas in conventional prior art practice, it is often necessary during such peak shopping hours for a customer to return to the auto parking area and find a cart for himself and return same to the market before he can shop; (4) it eliminates cart damage and cart loss of the types referred to hereinbefore since they will be immediately returned to the storage area within the market and virtually all likelihood of damage or loss will be eliminated because of this; (5) it is believed that, even in those cases where a shopper is in too much of a hurry to take the time and trouble to return a cart to the cart storing region even for a valuable token, other people in the area or coming into the area shortly thereafter are quite likely to take the trouble is push the cart to the nearest cart entryway or door and into the interior of the market in order to obtain the token. This will probably be especially true of children who would be anxious to obtain the tokens so they could purchase some merchandise, such as candy, soft drinks, or the like, and would probably cause all such carts, which are not returned by the actual user, to be returned by other persons very shortly thereafter in order to receive the valuable tokens. This would probably also be true even with respect to shoppers who are pedestrians and who roll such a grocery cart several blocks away from the market to their homes, since children in the area seeing such a cart would be impelled to return it to the market and push it through the cart return entryway or door in order to obtain the valuable token; (6) it would virtually completely eliminate the problem of carts being left in parking stalls and thus would eliminate or minimize cart damage and would maximize good customer relations; (7) no problems would be created by the above arrangement since the incoming cart storage area of the store would be inside of a turnstile and associated fencing, and since all such returned carts would have to pass a checkout stand in order to be removed from the store again. Therefore, there would be no unauthorized traffic in the use of the carts just to obtain tokens since this would be completely under the control of the checker at the checkout stand who would normally not permit empty carts to pass out of the market.

The locking arrangement for locking the door closure means over each such cart return entryway or door from the inside fo the market would permit maximum security when the store is close and yet would make it easy to place each such cart return door or entryway in open operative relationship when the door is open;

The coin-simulating tokens could be used over and over by the store so that the major expense would be the original installation of the apparatus and the redemption value of the tokens to the customers; and The above-described arrangement would also tend to provide a further incentive for the customer to continue to patronize the same store week after week in order to redeem his tokens.

With the above points in mind, it is an object of the present invention to provide apparatus of the character referred to herein, in any of the various generic and/or specific forms mentioned herein, either individually or in combination, and which is of extremely simple, inexpensive, foolproof, structurally strong, easy-to-install, easy-to-use, and substantially maintenance-free construction such as to be conducive to widespread use thereof.

Further objects are implicit in the detailed description which follows hereinafter (which is to be considered as exemplary of, but not specifically limiting the invention), and said objects will be apparent to persons skilled in the art after a careful study of the detailed description which follows hereinafter.

For the purpose of clarifying the nature of the present invention, one exemplary embodiment of the invention, and certain minor modifications of portions thereof, are illustrated in the hereinbelow described figures of the accompanying four sheets of drawings and are described in detail hereinafter.

FIG. 1 is a reduced-size, three-dimensional view illustrating one exemplary embodiment of the invention in installed relationship with respect to the wall of a market, or the like, and shows the apparatus from the outside of the market wall in open operative relationship ready for the return of a grocery or merchandise cart therethrough. The market wall is shown fragmentarily for space conservation reasons.

FIG. 2 is a view similar to FIG. 1, but shows the apparatus in closed and locked relationship.

FIG. 3 is another reduced-size, three-dimensional view of the apparatus of FIGS. 1 and 2 when in fully open relationship such as shown in FIG. 1, but shows it as seen from a position inside of the market wall and with certain portions of the apparatus such as the parts of the inside guide rail means and side wall means of screen material carried thereby being broken away for reasons of drawing simplification and clarity.

FIG. 4 is a view similar to FIG. 3, but shows the apparatus in fully closed and locked relationship.

FIG. 5 is a view taken substantially along the plane indicated by the arrows 5—5 of FIG. 3 and shows certain portions of the apparatus in section and certain portions thereof in elevation. This view also illustrates the use of an outside door retrieval extension hook means to facilitate closing and locking the outside door closure means from the interior of the market or store.

Figure 13:
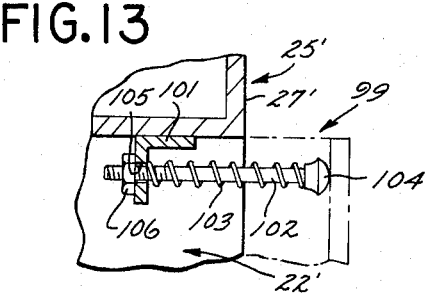

FIG. 6 is a view taken substantially along the plane indicated by the arrows 6—6 of FIG. 4, but is drawn to a somewhat larger scale and merely shows the central portion of the apparatus lying in the opening formed in the wall of the market or store and, of course, shows the apparatus in the closed locked relationship illustrated in FIG. 4. This view also further illustrates the use of the extension retrieval hook means of FIG. 5 for facilitating the closing and locking of the outside door means from the inside of the market. The fragmentary, phantom line showing at the bottom of FIG. 6 illustrates the position of the inside and outside door closure means when in the open relationship shown in FIGS. 1 and 3.

FIG. 7 is an enlarged fragmentary partially broken-away view, partly in elevation and partly in section, and with certain portions behind the plane of the section removed for reasons of drawing simplification and clarity, taken substantially along the plane indicated by the arrows 7—7 of FIG. 1 and illustrates the dispensing apparatus and the storing means which stores a plurality of valuable objects comprising tokens, and dispenses same down the dispensing chute means to the outside of the market wall each time a grocery cart is passed through the open entryway or door from the outside to the inside thereof as is best shown, although fragmentarily, in FIG. 10.

FIG. 8 is an enlarged fragmentary view, comprising partly a top plan view and partly a view in cross section, taken substantially along the plane indicated by the arrows 8—8 of FIG. 7, and further illustrates the valuable object storing and dispensing apparatus of FIG. 7.

FIG. 9 is a fragmentary view, as generally indicated by the arrows 9—9 of FIG. 8, and is partly in elevation with certain portions at about the center thereof partially broken away and shown in section for reasons of drawing clarity.

FIG. 10 is a view very similar to FIG. 5, although the plane of the section is not central but is taken on the extreme near side of both of the longitudinal track means and is drawn to a larger scale and shows just the central portion of the apparatus of FIG. 5 adjacent to the market wall, and further does not shown the outside door retrieval extension hook means of FIG. 5 but, instead, shows a rear portion of a grocery cart just as it is in the act of being fully and completely passed through the entryway or door means from the outside of the market wall to the inside thereof and as it is in the act of initiating a dispensing operation of the dispenser means best shown in FIGS. 7 and 8 to dispense one or more tokens through the dispensing chute means of FIG. 7 to the outside of the market for retrieval by a patron who has just pushed the grocery cart through the open entryway or door means. In this view, certain portions of the apparatus are not shown for reasons of drawing simplification and clarity.

FIG. 11 is another view similar to FIG. 4, but illustrates a slight modification of the invention wherein torsional biasing return spring means are provided at both the top and bottom of the apparatus as seen in FIG. 11.

FIG. 12 is an enlarged fragmentary sectional view, taken substantially along the plane indicated by the arrows 12—12 of FIG. 11.

FIG. 13 is an enlarged fragmentary sectional view taken substantially along the plane 13—13 of FIG. 11, with certain portions of the apparatus removed for reasons of drawing simplification and clarity, and illustrates a shock absorbing bumper or stop means adapted to stop the inside door means when it returns to the closed position shown in FIG. 11 under the action of the biasing torsional return spring means shown at the bottom of FIG. 11.

Figure 14:
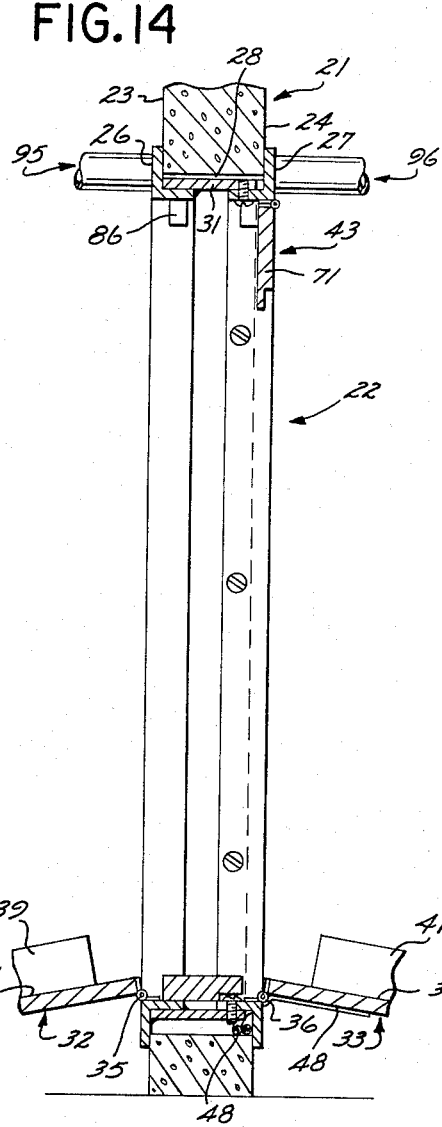

FIG. 14 is a fragmentary view, generally similar to FIG. 10, but illustrates a slight modification of the invention wherein the market wall is substantially thicker than shown in FIG. 10 and wherein an intermediate, substantially rectangular tunnel-like structure is connected between the inner and outer framework means. Otherwise, this modification is similar to the first form of the invention.

Figure 15:
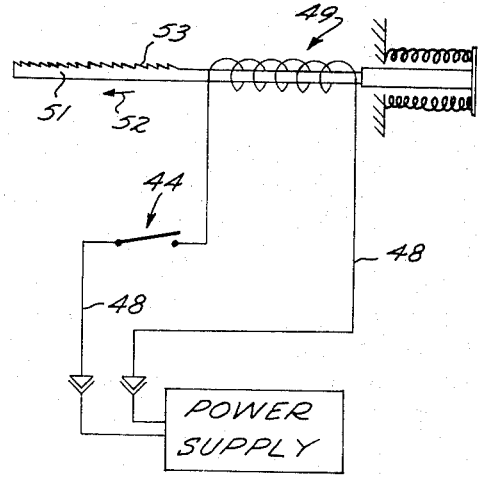

FIG. 15 is a fragmentary somewhat diagrammatic electrical schematic view illustrating the electric circuitry employed in operating the dispensing apparatus in the exemplary first form of the invention illustrated in FIGS. 1–10 and the very slight modifications thereof illustrated in FIGS. 11–13 and in FIG. 14.

Figure 16:
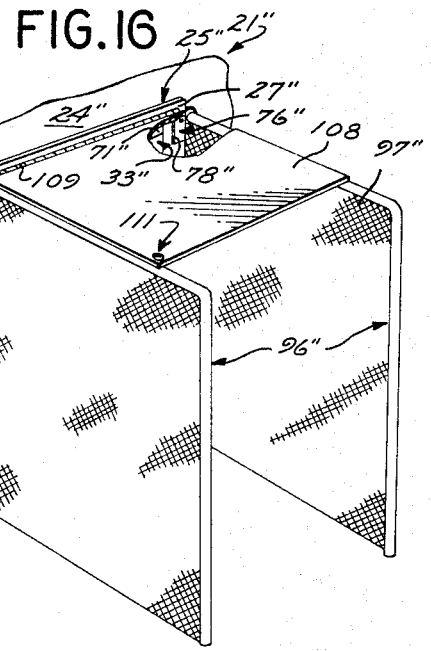

FIG. 16 is a fragmentary three-dimensional view generally similar to FIGS. 4 and 11, but illustrates a further modification of the invention wherein top portions of the inside guide rail means are provided thereacross adjacent to the inside of the market wall with a controllably openable, closable, and lockable cover means thereover which also effectively encloses the inside entrance to the token-storing and dispensing apparatus to prevent unauthorized entry thereinto from the interior of the market and also to prevent unauthorized false operation of the dispensing mechanism from the inside of the market for retrieval of tokens from the outside of the market by an accomplice.

Generally speaking, the exemplary grocery cart retrieval system embodying the exemplary preferred form of the invention illustrated in the drawings and described hereinafter for exemplary (but non-specifically limiting) purposes, may be said to comprise means defining an entryway or opening in an enclosure-defining wall means, such as the exemplary enclosure-defining market wall means generally indicated at 21, for example, although not specifically so limited, having the entryway or opening, generally designated at 22, extending from the exterior side 23 of said wall 21 to the interior side 24 of said wall 21. In the exemplary form, the entryway or opening 22 is shown as being of substantially rectangular shape, although not specifically so limited, and is shown as being formed by entryway-defining framework means, generally designated at 25 and, in the exemplary form illustrated, comprising an outside framework portion 26 andan inside framekork portion 27, each made of thin-sheet metal material either formed from a complete blank by suitable forming means or made, in each case, from four individual strips of formed metal, each having a cross-section similar to that of the well-known conventional "angle iron," although it may be made of any suitable material, and with each of said four form strips being suitably welded or joined at each of the four corners of the corresponding inner and outer framework portions 26 and 27.

In the example illustrated, each of said outer and inner framework portions 26 and 27 is appropriately inserted into the aperture or hole 22 in the wall 21 from the outside and inside thereof, respectively, and then may be suitably provided with sealing grout or the line in edge regions an exemplary one of which is indicated at 28, and the outer and inner frame portions 26 and 27 may be suitably fastened together with through bolts or other types of fastener means such as the welding of the inner abutting edges thereof as indicated at 29, and the entire framework means 25 may be suitably sealed in place by grout or other sealing compounds.

It should also be noted at this point that, in the event that the wall 21 is of substantially greater thickness than shown in FIGS. 5 and 6, an additional substantially rectangular intermediate tunnel means, such as is designated at 31 in FIG. 14, may be welded and/or adjustably bolted into place between the outer and inner framework portions 26 and 27, either inside thereof or outside thereof as is clearly shown in FIG. 14 and, if inside thereof, may have the outer edges thereof recessed inwardly sufficiently to allow for flush reception of the outside and inside doors, generally designated at 32 and 33. In the exemplary first form shown in FIGS. 1–10, such a supplementary tunnel 31 is not required in view of the thinness of the market wall 21. However, it should be clearly understood that these structures are interchangeable, and the description which follows hereinafter is to be construed in the light of this statement.

The purpose of the entryway or opening 22 is to provide a predetermined path of travel for the return of a grocery cart, such as is designated fragmentarily at 34 in FIG. 10, from the outside of the market wall 21 to the inside thereof, so that said cart 34 will then be inside of a grocery store or market for ready use by customers.

Said predetermined path of travel involves movement of the cart 34 a minimum distance from a position outside of the outside surface 23 of the market wall 21 through the entryway or opening 22 and into a position inside of the inside surface 24 of the market wall 21. In the example illustrated, this is facilitated by having the outside and inside doors 32 and 33, respectively, hingedly connected, as indicated at 35 and 36, respectively, to the lower outer and inner framework portions 26 and 27, respectively, so that said outside and inside doors 32 and 33 may be positioned in a manner such as is clearly shown in FIGS. 1, 3 and 5 so as to constitute outside and inside entry and exit ramps 37 and 38, respectively, each having its upper surface (upper when in the open relationship shown in said figures) provided with longitudinal guiding track means 39 and 41, respectively, which are adapted to effectively cooperate with and guide the plurality of underlying wheel means, one of which is shown at 40 in FIG. 10, of the grocery cart 34 whereby to guide the grocery cart 34 along the proper above-mentioned predetermined path of travel as it passes from a position outside of the market wall 21, through the entryway or opening 22, into a position inside of the market wall 21, which is the whole purpose of the invention.

It will be noted that the left ends of the outside longitudinal track means 39 and also the left ends of the inside longitudinal track means 41 are provided with centrally converging ends 39E and 41E, respectively, which are adapted to facilitate the alignment and positioning of the laterally spaced grocery cart wheels 40 on the outside of each of the corresponding longitudinal track members 39 and 41, respectively.

The entryway-defining framework means 25 is provided with value-dispensing apparatus operable in response to movement of the grocery cart 34 from the outside of the wall 21, through the entryway or opening 22 to a position inside of the market wall 21 whereby to dispense one valuable object, such as a token or the like (or any other predetermined number thereof).

In the exemplary first form illustrated, said value-dispensing apparatus is best shown in FIGS. 7 and 8, where it is generally designated by the reference numeral 42, and is operated by a pair of vehicle-passage-sensing means, such as generally designated at 43 and 44, each of which senses the passage of a different portion of the grocery cart 34 and initiates appropriate operation of a corresponding part of the dispensing apparatus generally indicated at 42 and best shown in FIGS. 7 and 8 whereby to dispense one of the tokens, such as indicated at 45 in FIGS. 7 and 8, so that it will fall down the downwardly forwardly angularly inclined dispensing chute 46 to the cup or retrieval trough 47 positioned at the bottom thereof and outside of the outer framework portion 26 so that the dispensed token 45 can be readily removed by a person who has just pushed the grocery cart 34 through the entryway or opening 22 into a position inside of the market wall 21 such as that about to be attained by the grocery cart 34 fragmentarily shown in FIG. 10.

It should be clearly noted that the previously mentioned vehicle-passage-sensing means 43 and 44 effectively comprise what might be termed dispenser operating means for initiating operation of the dispensing means 42 after the wheels of the cart, such as the one shown at 40 in FIG. 10 on the near side of the cart when in the position shown in FIGS. 3 and 10, have passed over the electrical switch means generally indicated at 44 which is connected by electric circuit means, indicated at 48, with respect to the electrically energizable linear motor means 49 whereby to cause the toothed member 51 to be extended in the direction of the arrow 52 in FIGS. 8 and 15 so that the outwardly and forwardly inclined teeth 53 thereof will forcibly cooperate with the oppositely directed teeth 54 of the rotatably movable plate or disc member 55 so as to rotate some 90 degrees in a clockwise direction as viewed in FIG. 8. Since there are four circular disc-shaped apertures 56 in the rotatably movable plate or disc 55, it will be understood that the one of said apertures 56 which underlies the inverted cylindrical tube 57 which effectively comprises a valuable object storing means since it stores a plurality of vertically stacked tokens 45, will receive under the action of gravity a bottom one of said tokens 45 in said aperture 56. Thereafter each of the two succeeding energizations of the electrically energizable linear motor means 49 (caused by each of the two suceeding operations of the electrical switch means 44 by the passage of the two near wheels 40 of the cart 34 thereover) will successively rotate said bottom token 45 in said one of said apertures 56 originally underlying the token storing tube 57 through two successive 90-degree rotative displacements into the lowermost position shown in FIG. 8, where said token 45 immediately overlies another movable apertured dispensing plate member 59 and a similar disc-shaped aperture 61 therein when the apparatus is in the position shown in FIGS. 7 and 8. Incidentally, it should be noted that said two movable plates, comprising the rotatably movable plate 55 (which is mounted by central pivot pin 62) and the rectilinerarly slidably movable plate 59, are both movably mounted above the base plate or supporting bracket 63 which is mounted by suitable fastening means 64 inside of the outer framework portion 26, and all effectively comprise portions of the previously mentioned value-dispensing means generally designated by the reference numeral 42.

It should be noted that the slidably movably mounted plate 59 is connected at its outer end by a curved portion 65 to a rotatable pin 66 which extends transversely which has a intermediate connecting portion or link 67 which extends outwardly through an opening 68 in the rear framework portion 27 and then has a laterally directed portion 69 which extends into and is effectively pivotally connected with respect to an upper effectively pivotally mounted abutment member 71 which extends completely across the top portion of the entryway or opening 22 and which is fastened by suitable hinge means 73 to the under edge of a top portion of said inner framework portion 27 so as to hang downwardly partly across the upper portion of said entryway or opening 22 whereby to be forcibly abutted by the handle portion 74 of the cart 34 as it passes through said entryway or opening 22 from the outside to the inside of the market wall 21, as shown in FIG. 10. In other words, the arrangement is such that the rotary crank-like linkage provided by the member composed of the parallel ends 66 and 69 and the intermediate conntecting portion 67 effectively connects the hingedly mounted abutment member 71 to the slidably movable plate member 59 so as to move the lowermost token 45, which has dropped into the aperture 61 therein from the upper aligned aperture 56 in the previously rotated plate or disc 55, outwardly or toward the right as viewed in FIGS. 7 and 8 until said aperture 61 lies directly over the open upper end portion 75 of the token dispensing chute 46 so that said token 45 will be downwardly dispensed thereinto and will fall into the outside positioned retrieval cup 47.

It should be noted that the apparatus just described, including the pivotally mounted abutment member 71 and the associated structure which operates the slide member 59, effectively comprises the previously mentioned vehicle-passage-sensing means, generally designated at 43, and is so arranged as to not drop the lowermost token 45 from the aperture 61 into the upper end 75 of the discharge chute 46 until such time as the extreme rear and uppermost portion of the cart handle 74 completely passes the rightwardly deflected extreme end of the pivotally mounted abutment member 71, thus preventing undesired rearward pulling movement of the cart handle 74 and movement of the cart 34 toward the left as viewed in FIG. 10 for a repeated actuation of the dispenser means 42 so that a person standing outside of the market wall 21 could obtain more than the proper number of tokens for the return of a cart.

It should be noted that there are two distinct conditions of operation of the token dispensing means 42, a first condition of operation comprising the operation thereof when there are no tokens in any of the circular disc-shaped apertures 56 of the rotary disc or plate member 55 except in the one of said apertures 56 underlying the token-carrying tube 57 and the vertical stack of tokens 45 carried therein, and a second condition of operation comprising the operation of the dispensing means 42 when various other ones (plural or single) of said apertures 56 in said rotary plate or disc member 55 have previously received tokens 45 therein and are in any of the four possible different 90-degree rotatively displaced positions thereof other than the one underlying the token-carrying tube 57 (in particular, the right one shown in FIG. 8). Said first condition of operation will normally occur when the dispensing means 42 is first operated after initial installation of the complete invention, or when it is operated at any time and, for any reason whatsoever, the three apertures 56 other than the one underlying the token-carrying tube 57 (in particular, the right one shown in FIG. 8) do not contain tokens 45. When this condition exists, it should be noted that the passage of both of the grocery cart right wheels (that is, both front and rear) such as the exemplary right rear one shown at 40 in FIG. 10, over the electrical switch means 44 effectively close same *twice* whereby to actuate the linear motor means 49 twice, which is important under said first condition of operation in order to move the bottom token 45 initially lying in the aperture 56 underneath the token-carrying tube 57 through two successive 90-degree rotations into a position overlying the apertures 61 in the slide plate member 59, if operation of the slide plate member 59 by the pivotally mounted abutment member 71 is to result in the dispensing of a token 45.

On the other hand, the above-mentioned second condition of operation is that which normally occurs after the dispensing means 42 has been operated a number of times since, when multiple operations thereof have occurred, it will normally be found that the aperture 56 shown at the right of the rotary disc or plate member 55 in FIG. 8 will normally already have a token 45 therein in the manner clearly shown in FIG. 8, and this will mean that only one closure of the electrical switch means 44 by the passage of one right wheel 40 of the grocery cart 34 thereover is necessary in order to bring about a dispensing of a token 45, since only a 90-degree rotation of the rotary disc or plate member 55 will be necessary to bring said rightwardly positioned token 45 of FIG. 8 into a position overlying the aperture 61 in the slide plate member 59, which, of course, must then also be actuated in the manner previously described by abutment of the cart handle 74 with the pivotally mounted abutment member 71 as said cart handle 74 passes completely thereunder in moving from the outside of the market wall 21 through the opening 22 to the inside of the market wall 21 in the manner clearly shown in FIG. 10.

Careful consideration of the above shows that under any condition of operation, multiple steps are required in order to initiate a token-dispensing operation, and these require either, under the first condition referred to above, the passage of two right hand cart wheels 40 successively over the switch 44 and then the immediately subsequent operation of the pivotally mounted abutment member 71 by the extreme rear uppermost portion of the handle 74 of the cart 34, or the second condition referred to above requires the passage of one right hand cart wheel 40 over the switch 44 and then the immediately subsequent operation of the pivotally mounted abutment member 71 by the extreme rear uppermost portion of the handle 74 of the cart 34.

If any of these steps are not performed in the proper sequence, there will be no token-dispensing operation, and this has the effect of preventing false operation of the dispensing means 42 by some person standing outside of the market wall 21 and either attempting to cause multiple operation of said token dispensing means 42 by rolling a grocery cart back and forth in the entryway or opening 22 or by reaching through with his hand or a tool and attemping to bring about false operation of the token dispensing means 42. It will be extremely difficulty for a person to do this because of the multiple steps required for initiation of a token dispensing operation as just described in detail above.

The valuable object, or token, storing means generally designated at 58 and also the token dispensing means generally designated at 42 are effectively positioned above and inwardly displaced from the outside portion 26 of the framework means 25 and inwardly of the inside framework portion 27 and are provided with controllably openable, closable, and lockable access means to provide convenient access thereto from the inside of the wall 21 whereby to make it possible to replace the plurality of tokens 45 in the token storing tube 57 as needed and/or to make it possible to service the dispensing apparatus 42 if such is needed.

In the exemplary form illustrated, said access means is generally designated at 76 and comprises a small door 77 hingedly mounted as indicated at 78 and provided with lock means, such as is generally designated at 79, for locking and unlocking the door 77.

The outside and inside closure door means 32 and 33, respectively, may be provided with means for effectively locking same when desired, such as during periods when the store or market is not open. In the exemplary first form of the invention illustrated, said means comprises an interiorly threaded fastener element 81 which actually comprises a nut welded into place on the inside of the outside door 32, or any other suitable female threaded fastener element 81, which is adapted to cooperate with a coresponding threaded outer end 82 of a longitudinal fastener element 83 which has an enlarged head 84 and which is adapted to be inserted through an aperture 85 from the inside of the closed inside door means 33 for threadedly drawing both the outside door 32 and inside door 33 toward each other and into firm fastening engagement with respect to the corresponding outside door stop member 86 and the corresponding recessed portion 87 of the previously mentioned pivotally mounted abutment member 71 which effectively acts as a stop member for the inside door 33 since there is an additional stop 88 positioned inside of said pivotally mounted abutment member 71 which prevents it from returning beyond a vertical plane as shown in FIG. 6.

To facilitate the door closing and locking operation described above, an extension retrieval hook member, such as is generally designated at 89, is provided and has a forward hook end 91 which can be hooked into the eye member 92 which is carried by the inside surface of the outside door 32. This operation is easily performed when both the inside and outside doors 32 and 33 are open, as shown in FIG. 5 and after the outside door 32 is drawn into the closed position shown in FIG. 6 it is then possible to close the inside door 33 into the closed position shown in FIG. 6 since the shaft of the extension hook member 89 will pass through the opening or slot 93. Then the operation of the threaded fastening bolt 83 by rotation of the handle portion 94 thereof will engage the threaded forward end 82 thereof within the female threaded element 81 carried by the inside surface of the outside door 32 and will lock the entire assembly firmly in the closed and locked relationship best shown in FIG. 6.

In the exemplary form illustrated, the outside framework portion 26 is provided with outwardly and downwardly directed outside guide rail means 95 defining the lateral limits of the proper path of travel of a cart into the entryway or opening 22. However, said guide rail means may be modified, provided with side wall means, provided with top means, partial or whole, or may be eliminated entirely in certain forms of the invention.

Also, in the exemplary first form of the invention illustrated, the inside framework portion 27 is provided with inwardly and downwardly directed inside guide rail means 96 which, in the example illustrated, are shown as being provided with vertically directed side wall means of screen material 97. In certain forms of the invention, said side wall means may be modified or eliminated and/or top wall means may also be provided if desired, and one such modification is illustrated hereinafter in FIG. 16.

It should be noted that, in the exemplary form of the invention illustrated, the inside or exit longitudinal track means 41 acts to guide the cart wheels into proper position for operation of the electrical switch means 44 which, incidentally, would normally be so positioned and camouflaged as to be substantially non-discernible to an onlooker so that a person would not realize that a switch means existed at this location. This would minimize any likelihood of purposeful false operation of the token dispensing means 42. However, it should be noted that, in certain forms of the invention, the inside longitudinal track means 41 may be eliminated entirely and, in lieu thereof, means for actuating the electrical switch 44 may extend completely across the width of the upper surface of the inside door 33 so that said electrical switch means 44 will be closed irrespective of the position and orientation of the cart 34 in passing down the inside ramp 38 comprising the upper surface of the inside door 33.

Incidentally, in connection with the above, please note that the reverse side of the electrical switch means 44 may also be mounted in a recessed or covered manner so as to be non-visibly discernible when the inside door means 33 is closed—this being for substantially the same purpose as mentioned above in connection with rendering the upper or operative side of said switch means 44 non-discernible.

It should be noted that, in the exemplary first form illustrated, the slide member 59 is freely slidably mounted between the rotatable upper plate 55 and the fixed lower plate 63 and the weight of the pivotally mounted abutment member 71 is sufficient to return it to its normal vertical orientation under the action of gravity after it has been inwardly deflected by the cart handle 74, in the manner shown in the process of being performed in FIG. 10. Also, in said exemplary first form of the invention, the inside door 33 normally remains in the open position clearly shown in FIGS. 3, 5, and 10 when the apparatus is in operative condition. However, under some circumstances of use, this may be undesirable. For example, in the winter, in extremely cold climates, a substantial heat loss might occur through the opening 22 and, therefore, it may be desirable to cause the inside door 33 to automatically close after each cart 34 has been pushed through the opening 22 into the interior of the market or store.

Such a slightly modified arrangement is illustrated in FIGS. 11–13, and two further modifications are also incorporated in said figures in order to extend the scope of the present invention. Similar parts of this modified form of the invention are indicated by similar reference numerals primed, however. It will be noted that in this modification the bottom hinge means junction 36' hingedly joining the inside door 33' with respect to the inside frame portion 27' is effectively provided with torsional biasing return spring means 98 which acts to normally return the inside door 33' to the closed position shown in FIGS. 11–13 after each passage of a grocery cart thereover by way of the opening 22'.

In order to stop the inside door 33' at each such return thereof to its uppermost closed position, this modification of the invention includes shock absorber means, such as generally designated at 99, and which comprises a mounting bracket 101 fastened to the framework means 25' and carrying a longitudinal bolt member 102 having a compression spring 103 mounted between an enlarged rubber cushioned head 104 and the bracket member 101, with the left end of the bolt 102 passing through an aperture 105 in said bracket member 101 and being provided with an adjustable retaining nut 106. This provides a compression type shock absorber with a rubber cushioned head 104 adapted to receive and absorb the impact of the closing inside door 33'. However, it should be noted that various other types of shock absorber means may be employed in lieu of the exemplary one illustrated at 99 in FIG. 13 and may be of the damped or hysteretic loss type adapted to absorb and dissipate the energy of the closing inside door 33 so as to not elastically return same to the door.

It will also be noted that, in this modification, the pivotally mounted upper abutment member 71' is also provided with a biasing return torsional spring means, 107, which is substantially the same in construction as the lower one shown at 98 and which positively returns the pivotal abutment member 71' to its vertical position after actuation by a cart handle in a manner similar to that shown in FIG. 10 of the first form of the invention and does so quite irrespective of gravity.

FIG. 16 merely illustrates, in fragmentary form, a slight modification of the first form of the invention and similar parts are indicated by similar reference numerals, doubly primed, however. In this version, it will be noted that the inside guide rail means 96" are provided across the top thereof to a predetermined outward extent with a controllably openable, closable, and lockable cover means designated at 108 which is hingedly connected by hinge means 109 to the inner framework means portion 27" and which has locking means 111 for effectively locking same in closed relationship when desired. It will be noted that when locked in said closed relationship it substantially completely encloses the region where the operating pivotally mounted abutment member 71" is mounted and, thus, prevents any likelihood of improper false operation thereof from the inside of a market for the purpose of causing a false dispensing of tokens to an accomplice positioned outside of the market. This arrangement is also such as to enclose the complete access means 76" to the token storing and token dispensing apparatus and means, which access means 76" does not need to be individually locked in all forms thereof because of the protection provided by the hingedly mounted lockable cover means 108.

It should be noted that while a particular type of dispenser operating means embodying the pivotally mounted abutment means 71, the electrical switch means 44, the rotary plate 55, the slidable plate 59, the electrically energizable linear motor means 49, and the linkage means 67, has been described and illustrated herein as comprising a particularly advantageous type of dispenser operating means, it should be noted that the invention is not specifically so limited in all forms thereof. Actually, various other types of dispenser operating means, either electrical, mechanical, or any combination thereof, and/or including multiple such means operated either sequentially or simultaneously, or in any combination thereof, or even a single such dispenser operating means of any of said types may be employed in lieu of the exemplary arrangement illustrated in the drawing and described in detail hereinbefore—the major requirement being the fact that operation thereof is effectively caused by passage of the cart or vehicle 34 through the opening or entryway 22 from the outside to the inside thereof, and all such modified dispenser operating means and arrangements, and also such arrangements adapted to dispense various other types of valuable objects, are all intended to be included and comprehended within the broad scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. A value dispensing apparatus operable in response to movement of a vehicle a minimum distance along a predetermined path, comprising: entryway-defining framework means adapted to be mounted in an aperture in an enclosure-defining wall between an exterior side and an interior side thereof and to define an entryway opening therethrough; valuable object storing means adapted to store a plurality of valuable objects, each comprising a flat disc-shaped coin-simulating token means, in vertically stacked relationship and provided with controllably operable dispensing means cooperable with said valuable object storing means and adapted, in response to each individual operation thereof, to dispense a desired number, comprising at least one, of said token means from the bottom end of the vertically stacked plurality thereof, said controllably operable dispensing means being provided with dispenser operating means for initiating operation of said dispensing means in response to movement of a cart type of wheeled vehicle a minimum distance along a predetermined path through said entryway opening from the exterior side to the interior side of said enclosure-defining wall means, said dispenser operating means comprising at least a pair of vehicle-passage-sensing means each differently positioned along said predetermined minimum distance path of movement of said vehicle after it has been passed through said entryway opening from the exterior side of said enclosure-defining wall means to the interior side thereof and, in response to such sensing of said vehicle by both of said vehicle-passage-sensing means at said two different positions, acting in two different successively cooperative ways to conjointly initiate operation of said dispensing means whereby to cause one complete dispensing operation thereof; said dispensing means including a downwardly and outwardly angularly inclined dispensing chute means having an outwardly open and accessible cup means at the bottom end thereof carried by the outer portion of said entryway-defining framework means and having an upper inner portion positioned in receiving relationship relative to said storing means and there being provided with a pair of vertically adjacent relatively movable apertured dispensing plates, each one of which is effectively first movable into a first dispensing position in manner such as to place a top aperture directly over a bottom aperture for downward transfer of a token from said top aperture to said bottom aperture, and the bottom one of which is then slidably movable into a second dispensing position in a manner such as to place said bottom aperture directly above the upper end of said dispensing chute means, in response to the activation of the corresponding ones of said two vehicle-passage-sensing means, respectively.

2. A value dispensing apparatus operable in response to movement of a vehicle a minimum distance long a predetermined path, comprising: entryway-defining framework means adapted to be mounted in an aperture in an enclosure-defining wall between an exterior side and an interior side thereof and to define an entryway opening therethrough; valuable object storing means adapted to store a plurality of valuable objects, each comprising a flat disc-shaped coin-simulating token means, in vertically stacked relationship and provided with controllably operable dispensing means cooperable with said valuable object storing means and adapted, in response to each individual operation thereof, to dispense a desired number, comprising at least one, of said token means from the bottom end of the vertically stacked plurality thereof, said controllably operable dispensing means being provided with dispenser operating means for initiating operation of said dispensing means in response to movement of a cart type of wheeled vehicle a minimum distance along a predetermined path through said entryway opening from the exterior side to the interior side of said enclosure-defining wall means, said dispenser operating means comprising at least a pair of vehicle-passage-sensing means each differently positioned along said predetermined minimum distance path of movement of said vehicle after it has been passed through said entryway opening from the exterior side of said enclosure-defining wall means to the interior side thereof and, in response to such sensing of said vehicle by both of said vehicle-passage-sensing means at said two different positions, acting in two different successively cooperative ways to conjointly initiate operation of said dispensing means whereby to cause one complete dispensing operation thereof; said dispensing means including a downwardly and outwardly angularly inclined dispensing chute means having an outwardly open and accessible cup means at the bottom end thereof carried by the outer portion of said entryway-defining framework means and having an upper inner portion positioned in receiving relationship relative to said storing means and there being provided with a pair of vertically adjacent relatively movable apertured dispensing plates, each one of which is effectively first movable into a first dispensing position in manner such as to place a top aperture directly over a bottom aperture for downward transfer of a token from said top aperture to said bottom aperture, and the bottom one of which is then slidably movable into a second dispensing position in a manner such as to place said bottom aperture directly above the upper end of said dispensing chute means, in response to the activation of the corresponding ones of said two vehicle-passage-sensing means, respectively, one of said vehicle-passage-sensing means comprising an upper effectively pivotally mounted abutment member positioned for abutment by the rearwardly positioned handle of said cart type vehicle as it is pushed through said entry-way-defining framework means from the exterior side thereof to the interior side thereof, said abutment member being provided with linkage means effectively linking same with respect to the bottom one of said vertically adjacent relatively movable dispensing plates of said dispensing means for physically moving said aperture thereof into said second dispensing position when said abutment member is inwardly hingedly deflected by said handle of said cart type vehicle, said other one of said vehicle-passage-sensing means positioned in the path of travel of said vehicle after it has passed through said entry-way-defining framework means from the outside to the inside thereof and provided with electric circuit means and electrically energizable motor means electrically connected thereto and physically effectively connected with respect to the top one of said vertically adjacent relatively movable plates of said dispensing means for movement of at least one of a plurality of apertures thereof from a receiving position under said storing means into said first dispensing position vertically aligned with the bottom aperture of said bottom one of said movable vertically adjacent dispensing plates, when operated by said abutment member into said first dispensing position, said circuit means being adapted to be connected to a source of electrical energy for energizing said electrically energizable motor means when said electrical switch means is closed by passage of said vehicle thereby.

3. A value dispensing apparatus operable in response to movement of a vehicle a minimum distance along a predetermined path, comprising: entryway-defining framework means adapted to be mounted in an aperture in an enclosure-defining wall between an exterior side and an interior side thereof and to define an entryway opening therethrough; valuable object storing means adapted to store a plurality of valuable objects, each comprising a flat disc-shaped coin-simulating token means, in vertically stacked relationship and provided with controllably operable dispensing means cooperable with said valuable object storing means and adapted, in response to each individual operation thereof, to dispense a desired number, comprising at least one, of said token means from the bottom end of the vertically stacked plurality thereof, said controllably operable dispensing means being provided with dispenser operating means for initiating operation of said dispensing means in response to movement of a cart type of wheeled vehicle a minimum distance along a predetermined path through said entryway opening from the exterior side to the interior side of said enclosure-defining wall means, said dispenser operating means comprising at least a pair of vehicle-passage-sensing means each differently positioned along said predetermined minimum distance path of movement of said vehicle after it has been passed through said entryway opening from the exterior side of said enclosure-defining wall means to the interior side thereof and, in response to such sensing of said vehicle by both of said vehicle-passage-sensing means at said two different positions, acting in two different successively cooperative ways to conjointly initiate operation of said dispensing means whereby to cause one complete dispensing operation thereof; said entryway-defining framework means being provided with an outside closure door means hingedly connected at its bottom edge with respect to a corresponding outside bottom portion of said entryway-defining framework means and hingedly movable between a vertically directed entry-closing position and an outwardly directed open position wherein the inner upper side of said outside closure door means effectively comprises a guiding entry ramp means, and wherein said entryway-defining framework means is provided with an inside closure door means hingedly connected at its bottom edge with respect to a corresponding inside bottom portion of said entryway-defining framework means and hingedly movable between a vertically directed entryway closing position and an inwardly directed open position wherein the inner upper side of said inside closure door means effectively comprises a guiding exit ramp means, said door means being provided with threaded fastener element means carried thereby and with controllably removable threaded interconnection member for threadedly and forcibly drawing said outside and inside door means inwardly and outwardly, respectively, relative to said entryway-defining framework means for firmly and positively locking said outside and inside door means relative thereto and controllably operable from the inside thereof to prevent unauthorized opening thereof from the outside thereof.

4. A value dispensing apparatus operable in response to movement of a vehicle a minimum distance along a predetermined path, comprising: entryway-defining framework means adapted to be mounted in an aperture in an enclosure-defining wall between an exterior side and an interior side thereof and to define an entryway opening therethrough; valuable object storing means adapted to store a plurality of valuable objects, each comprising a flat disc-shaped coin-simulating token means, in vertically stacked relationship and provided with controllably operable dispensing means cooperable with said valuable object storing means and adapted, in response to each individual operation thereof, to dispense a desired number, comprising at least one, of said token means from the bottom end of the vertically stacked plurality thereof, said controllably operable dispensing means being provided with dispenser operating means for initiating operation of said dispensing means in response to movement of a cart type of wheeled vehicle a minimum distance along a predetermined path through said entryway opening from the exterior side to the interior side of said enclosure-defining wall means, said dispenser operating means comprising at least a pair of vehicle-passage-sensing means each differently positioned along said predetermined minimum distance path of movement of said vehicle after it has been passed through said entryway opening from the exterior side of said enclosure-defining wall means to the interior side thereof and, in response to such sensing of said vehicle by both of said vehicle-passage-sensing means at said two different positions, acting in two different successively cooperative ways to conjointly initiate operation of said dispensing means whereby to cause one complete dispensing operation thereof; said entryway-defining framework means being provided with an inside closure door means hingedly connected at its bottom edge with respect to a corresponding inside bottom portion of said entryway-defining framework means and hingedly movable between a vertically directed entryway closing position and an inwardly directed open position wherein the inner upper side of said inside closure door means effectively comprises a guiding exit ramp means, said inside closure door means being provided with biasing spring means normally biasing said inside door means into said vertically directed entryway-closing position.

5. A value dispensing apparatus operable in response to movement of a vehicle a minimum distance along a predetermined path, comprising: entryway-defining framework means adapted to be mounted in an aperture in an enclosure-defining wall between an exterior side and an interior side thereof and to define an entryway opening therethrough; valuable object storing means adapted to store a plurality of valuable objects, each comprising a flat disc-shaped coin-simulating token means, in vertically stacked relationship and provided with controllably operable dispensing means cooperable with said valuable object storing means and adapted, in response to each individual operation thereof, to dispense a desired number, comprising at least one, of said token means from the bottom end of the vertically stacked plurality thereof, said controllably operable dispensing means being provided with dispenser operating means for initiating operation of said dispensing means in response to movement of a cart type of wheeled vehicle a minimum distance along a predetermined path through said entryway opening from the exterior side to the interior side of said enclosure-defining wall means, said dispenser operating means comprising at least a pair of vehicle-passage-sensing means each differently positioned along said predetermined minimum distance path of movement of said vehicle after it has been passed through said entryway opening from the exterior side of said enclosure-defining wall means to the interior side thereof and, in response to such sensing of said vehicle by both of said vehicle-passage-sensing means at said two different positions, acting in two different successively cooperative ways to conjointly initiate operation of said dispensing means whereby to cause one complete dispensing operation thereof; an inside portion of said entryway-defining framework means being additionally provided with inwardly and downwardly directed inside guide rail means defining lateral limits of an exit portion of said minimum distance predetermined path of travel, said inside guide rail means being provided with a vertically directed side wall means, with top portions of said inside guide rail means being provided thereacross, adjacent to an inside portion of said entryway-defining framework means and extending therefrom a predetermined distance, with controllably openable closable and lockable cover means.

References Cited by the Examiner
UNITED STATES PATENTS

| | | | |
|---|---|---|---|
| 2,753,970 | 7/1956 | Breeler | 194—4 |
| 2,818,955 | 1/1958 | Stackhouse | 194—4 |
| 3,165,189 | 1/1965 | Easterday | 194—4 |

ROBERT B. REEVES, *Primary Examiner.*

STANLEY H. TOLLBERG, *Examiner.*